United States Patent
Fukuda

(10) Patent No.: US 8,126,219 B2
(45) Date of Patent: Feb. 28, 2012

(54) IMAGE PROCESSING APPARATUS, IMAGE PROCESSING METHOD, AND IMAGING APPARATUS

(75) Inventor: Takeshi Fukuda, Chiba (JP)

(73) Assignee: Sony Corporation (JP)

( * ) Notice: Subject to any disclaimer, the term of this patent is extended or adjusted under 35 U.S.C. 154(b) by 1161 days.

(21) Appl. No.: 11/716,356

(22) Filed: Mar. 9, 2007

(65) Prior Publication Data

US 2007/0286488 A1   Dec. 13, 2007

(30) Foreign Application Priority Data

Mar. 29, 2006   (JP) .............................. P2006-090906

(51) Int. Cl.
*G06K 9/00* (2006.01)

(52) U.S. Cl. ........ 382/118; 382/115; 382/116; 382/278; 382/286

(58) Field of Classification Search .................. 382/118, 382/115, 116, 278, 286

See application file for complete search history.

(56) References Cited

U.S. PATENT DOCUMENTS

| 7,574,016 B2 * | 8/2009 | Steinberg et al. | 382/103 |
| 2004/0228505 A1 * | 11/2004 | Sugimoto | 382/118 |
| 2007/0030381 A1 * | 2/2007 | Maeda | 348/345 |
| 2007/0154095 A1 * | 7/2007 | Cao et al. | 382/190 |

FOREIGN PATENT DOCUMENTS

| JP | 2004220555 A | 8/2004 |
| JP | 2004334836 A | 11/2004 |
| JP | 2005-044330 A | 2/2005 |
| JP | 2006-048328 A | 2/2006 |

OTHER PUBLICATIONS

Office Action from Japanese Application No. 2006-090906, dated Mar. 23, 2010.

* cited by examiner

*Primary Examiner* — Mike Rahmjoo
(74) *Attorney, Agent, or Firm* — Lerner, David, Littenberg, Krumholz & Mentlik, LLP

(57) ABSTRACT

An image processing apparatus includes: image acquiring means for acquiring an image; search-window-size setting means for setting a size of a search window; search-range setting means for setting a search range in the image in relation to the set size of the search window; scanning means for moving the search window having the set size in the set search range; face-area determination means for determining whether the image in the search window at each scanning position is a face area; and face-information output means for outputting information of the face area obtained from a determination result of the face-area determination means.

8 Claims, 5 Drawing Sheets

AREA INCLUDING A FACE

AREA INCLUDING A FACE

FACE DISTRIBUTION MAP

DETECTION OF LARGE-FACE AREA
(SMALL AMOUNT OF CALCULATION)

DETECTION OF SMALL-FACE AREA
(LARGE AMOUNT OF CALCULATION)

IMAGE PROCESSING APPARATUS, IMAGE PROCESSING METHOD, AND IMAGING APPARATUS

CROSS REFERENCES TO RELATED APPLICATIONS

The present invention contains subject matter related to Japanese Patent Application JP 2006-090906 filed in the Japanese Patent Office on Mar. 29, 2006, the entire contents of which are incorporated herein by reference.

BACKGROUND OF THE INVENTION

1. Field of the Invention

This invention relates to an image processing apparatus, an information processing method, and an imaging apparatus.

2. Description of the Related Art

A face-image detection technique can be used, for example when viewing a plurality of photographic images captured by a digital still camera, etc. The technique is used for searching a photograph, etc., by extracting face information from each photograph and using the face information as an index to that photograph. Also, the technique is used when adjusting the image quality of a photograph. The image quality is adjusted such that the extracted face area becomes the best one. Furthermore, a face area is detected from an image being captured in real time in order to adjust the camera so that the face area is best exposed or focused. Also, a shooting direction of a camera is controlled by a pan/tilter in order for a face position to be in the center. Moreover, face-image recognition can be applied to a field of security, such as personal identification, etc.

For example, Japanese Unexamined Patent Application Publication No. 20005-44330 describes, in order to determine whether an image in a search window (in the following, referred to as a partial image appropriately) is a face, a method of recognizing a face image, in which a comparison calculation is performed between the pixel values of the partial image and a learning dictionary.

Also, Japanese Unexamined Patent Application Publication No. 2006-48328 describes a face-detection apparatus which allows easy detection of a face area from a shiny image due to the reflected light by glasses, etc.

As described in Japanese Unexamined Patent Application Publication Nos. 2005-44330 and 2006-48328, in a method of detecting a face image, which is applied to a real-time image or stored image data, an image is scanned by a search window to obtain a partial image corresponding to each search window, and whether or not the partial image includes a face is detected. As a method of detecting a face area, for example, comparison processing is performed between the partial image and a template having been obtained by learning in advance. It is possible to use another method of detecting a face area in addition to this. For example, Japanese Unexamined Patent Application Publication No. 2006-48328 describes the following methods. One is a method in which the pixels of a partial image are vectorized and are projected onto a main component space, a distance of the vector to the main component space and the distance of the vector in the main component space are calculated, and a determination is made on whether there is a face area in the partial image. The other is a method in which a face area and an eye-area position are identified from the difference information between a background image (an image not including a human figure) and an image including a human figure.

FIGS. 6A and 6B illustrate one example and another example of scanning for taking out a partial image, respectively. The images shown in FIGS. 6A and 6B are individual examples obtained by acquiring the same object of shooting, but are different in the size of a face. In order to take out a partial image, a search window indicated by a quadrilateral, for example a square is used for scanning, for example from the upper left corner to the lower right corner of the images. The search window is moved its position in the horizontal direction and in the vertical direction by m pixel steps. The m pixels are preferable to be direct proportional to the size of the search window, and are set, for example about one tenth of the length of one side. An appropriate size of the search window is different between relatively large faces shown in FIG. 6A and relatively small faces shown in FIG. 6B. In the case of large faces, the size of the search window becomes large.

SUMMARY OF THE INVENTION

There may be faces of various sizes in one image, and thus it is necessary to change the size of a search window for taking out a partial image. Face-detection processing is performed individually for the search windows of dozens of sizes. As described above, when the amount of movement is changed nearly proportional to the size of the search window, if the search window is small, the total number of the search windows generated in the scanning becomes large, and thus the amount of calculation for determining a face area increases. Also, if the size of the image to be processed (resolution) becomes large, the amount of calculation increases. Such an increase in the amount of processing causes an increase in the load for the CPU, and thus there has been a problem in that the processing time becomes long. In particular, the processing power of a microcomputer incorporated in a mobile apparatus, such as a digital still camera, a cellular phone, a personal digital assistant is not so high, and thus it has been difficult to perform face detection in a short time without deteriorating precision.

On the other hand, in the case of a real snapshot taken of a human figure, there is a certain degree of tendency or deviation in the position of a face area taken as an object of shooting. In the case of a face of an object of shooting to be a main subject of a photograph, a face area is often located in the vicinity of the center of a captured image. However, the face-detection processing is performed on the entire image, and thus there has been problems in that a face that is unnecessary to be detected originally, a face that has been accidentally shot, etc., are detected. It is possible to implement an application, such as retrieval processing on an image file, etc., on the basis of a result of face-area detection. However, if an unintended face area is detected as described above, the inconvenience such as having a wrong retrieval result is caused.

Accordingly, it is desirable to provide an image processing apparatus, an image processing method, and an imaging apparatus which are capable of shortening the processing time for detecting a face area without decreasing the detection precision.

According to an embodiment of the present invention, there is provided an image processing apparatus including: image acquiring means for acquiring an image; search-window-size setting means for setting a size of a search window; search-range setting means for setting a search range in the image in relation to the set size of the search window; scanning means for moving the search window having the set size in the set search range; face-area determination means for determining whether the image in the search window at each scanning position is a face area; and face-information output means for outputting information of the face area obtained from a determination result of the face-area determination means.

According to an embodiment of the present invention, there is provided a method of image processing, including the steps of: image acquiring for acquiring an image; search-window-size setting for setting a size of a search window; search-range setting for setting a search range in the image in relation to the set size of the search window; scanning for moving the search window having the set size in the set search range; face-area determining for determining whether the image in the search window at each scanning position is a face area; and face-information outputting for outputting information of the face area obtained from a determination result of the face-area determining step.

According to an embodiment of the present invention, there is provided an imaging apparatus including: a camera section for acquiring an image of an object of shooting; a camera-signal processing section for performing signal processing on an imaging signal from the camera section; a storage section for storing the imaging signal; and a control section for controlling operations of the imaging apparatus, wherein the control section includes a search-window-size setting section for setting a size of a search window; a search-range setting section for setting a search range in the image of an object of shooting in relation to the set size of the search window; a scanning section for moving the search window having the set size in the set search range; a face-area determination section for determining whether the image in the search window at each scanning position is a face area; and a face-information output section for outputting information of the face area obtained from a determination result of the face-area determination section.

By this invention, the search range of a face area is limited to a range narrower than the entire range of the target image, and thus the amount of calculation necessary for the face-area detection processing is decreased, making it possible to shorten the processing time. The search range is limited only in the case where the search window has a relatively small size. Accordingly, the detection of a large face like the one to be a main subject of the photograph will not be omitted, and thus it is possible to prevent a decrease in the detection precision.

DESCRIPTION OF THE PREFERRED EMBODIMENTS

In the following, a description will be given of an embodiment of the present invention with reference to the drawings.

Figure 1:
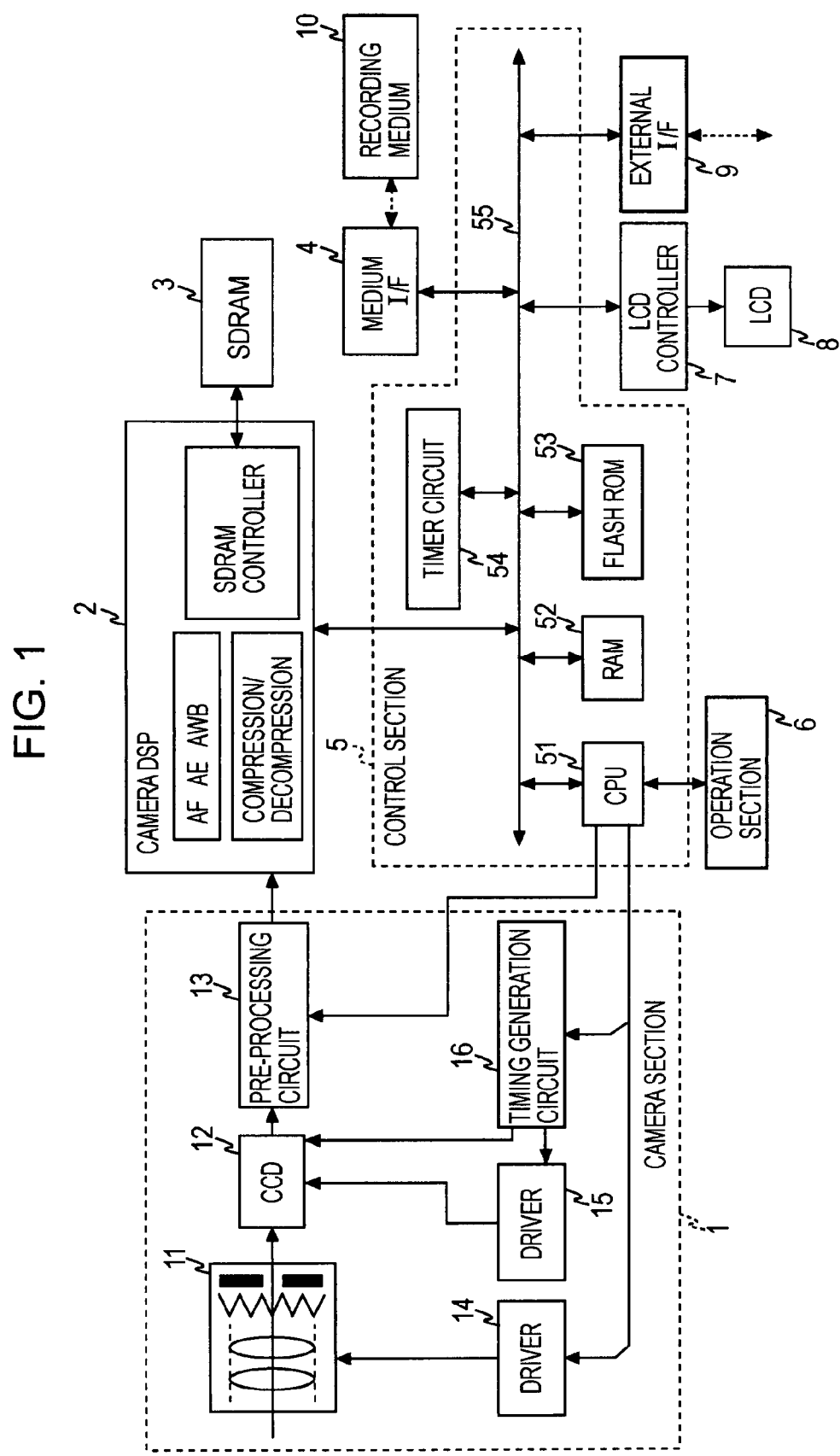
FIG. 1 is a block diagram illustrating an example of the configuration of an imaging apparatus according to an embodiment of the present invention.

In this embodiment, the invention is applied to an imaging apparatus, which has the configuration shown in FIG. 1. The imaging apparatus includes a camera section 1, a camera DSP (Digital Signal Processor) 2, an SDRAM (Synchronous Dynamic Random Access Memory) 3, a medium interface (in the following, referred to as a medium I/F) 4, a control section 5, an operation section 6, an LCD (Liquid Crystal Display) controller 7, an LCD 8, and an external interface (in the following, referred to as an external I/F) 9. A recording medium 10 is removably attached to the imaging apparatus.

The recording medium 10 is a so-called a memory card using a semiconductor memory, for example. In addition to a memory card, it is possible to use a hard disk, an optical recording medium such as a recordable DVD (Digital Versatile Disc), a recordable CD (Compact Disc), etc., a magnetic disk, and the like.

The camera section 1 includes an optical block 11, a CCD (Charge Coupled Device) 12, a pre-processing circuit 13, an optical block driver 14, a CCD driver 15, and a timing generation circuit 16. Here, the optical block 11 includes a lens, a focus mechanism, a shutter mechanism, an aperture (iris) mechanism, etc.

The control section 5 is a microcomputer having a configuration in which a CPU (Central Processing Unit) 51, a RAM (Random Access Memory) 52, a flash ROM (Read Only Memory) 53, a timer circuit 54 are connected through a system bus 55. The control section 5 controls each section of the imaging apparatus of this embodiment. The RAM 52 is mainly used as a working area, such as for temporarily storing the intermediate result of the processing. The flash ROM 53 stores various programs executed by the CPU 51, data necessary for the processing, etc. The timer circuit 54 provides a current date, a current day of the week, a current time, a shooting date and time, etc.

At shooting time, the optical block driver 14 forms a drive signal for operating the optical block 11 under the control of the control section 5, supplies the drive signal to the optical block 11, and operates the optical block 11. In the optical block 11, the focus mechanism, the shutter mechanism, and the aperture mechanism are controlled in accordance with the drive signal from the driver 14, the image of the object of shooting is captured, and the image of the object is supplied to the CCD 12.

The CCD 12 performs photoelectric conversion on the image of the object from the optical block 11, and outputs it. The CCD 12 is operated in accordance with the drive signal from the CCD driver 15 to capture the image of the object. The captured image of the object is supplied to the pre-processing circuit 13 as an electronic signal on the basis of the timing signal from the timing generation circuit 16 controlled by the control section 5.

In this regard, as described above, the timing generation circuit 16 forms a timing signal for supplying predetermined timing under the control of the control section 5. Also, the CCD driver 15 forms a timing signal for supplying a drive signal to the CCD 12 on the basis of the timing signal from the timing generation circuit 16.

The pre-processing circuit 13 performs CDS (Correlated Double Sampling) processing on the supplied image signal to improve the S/N ratio, performs AGC (Automatic Gain Control) processing to control the gain, and performs A/D (Analog/Digital) conversion to form the image data as a digital signal.

The digital image data from the pre-processing circuit 13 is supplied to the DSP 2. The DSP 2 performs camera-signal processing, such as AF (Auto Focus), AE (Auto Exposure), AWB (Auto White Balance), etc., on the image data. The image data, which has been subjected to the camera-signal processing, is subjected to data compression by a predetermined compression method, and is supplied to the recording medium 10 attached through the system bus 55 and the medium I/F 4 to be recorded in the recording medium 10 as an image file.

Also, the target image data of the image data recorded in the recording medium 10 is read from the recording medium 10 through the medium I/F 4 in accordance with the operation input from the user, which has been accepted through the operation section 6 including a touch panel, a control key, etc., and then is supplied to the DSP 2.

The DSP 2 performs decompression processing (expansion processing) on the compressed image data, which has been read from the recording medium 10 and supplied through the medium I/F 4, and supplies the decompressed image data to the LCD controller 7 through the system bus 55. The LCD controller 7 forms a display-image signal to be supplied to the LCD 8 from the image data, and supplies the display-image signal to the LCD 8. Thus, the image corresponding to the image data recorded in the recording medium 10 is displayed on the LCD 8.

In this regard, the display form of the image depends on the display-processing program recorded in the ROM. That is to say, this display-processing program is a program which specifies the structure of the file system described below and the way of reproducing the image.

Also, the imaging apparatus is provided with the external I/F 9. For example, an external personal computer is connected to the imaging apparatus through the external I/F 9. Thus, it is possible for the imaging apparatus to receive the image data supplied from the personal computer, and records it in the recording medium attached to the apparatus itself. Also, it is possible for the imaging apparatus to supply the image data recorded in the recording medium attached to the apparatus to the external personal computer.

Also, by connecting a communication module to the external I/F 9, for example, by connecting to a network, such as the Internet, it is possible for the imaging apparatus to obtain various image data and the other information through the network, and to record the image data in the recording medium attached to the apparatus itself. Alternatively, it is possible for the imaging apparatus to transmit the data recorded in the recording medium attached to the apparatus itself to a transmission destination through the network.

Also, it is possible for the imaging apparatus to read and reproduce the information, such as the image data which has been obtained through an external personal computer or a network and has been recorded in the recording medium, as described above, and to display it to the LCD 8.

In this regard, it is possible for the external I/F 9 to be provided as a wired interface, such as IEEE (Institute of Electrical and Electronics Engineers) 1394, USB (Universal Serial Bus), etc. Also, it is possible for the external I/F 9 to be provided as a wireless interface by light or a radio wave. That is to say, the external I/F 9 may be either of a wired or wireless interface.

As described above, it is possible for the imaging apparatus of an embodiment to capture the image of the object of shooting, and to record the captured image in the recording medium attached to the apparatus. Also, it is possible for the imaging apparatus to read the image data recorded in the recording medium, to reproduce the image data, and to use the image data. Also, it is possible for the imaging apparatus to receive the image data supplied through an external personal computer or a network, and to record the image data in the recording medium attached to the apparatus itself, and to read and reproduce the image data.

Figure 2:
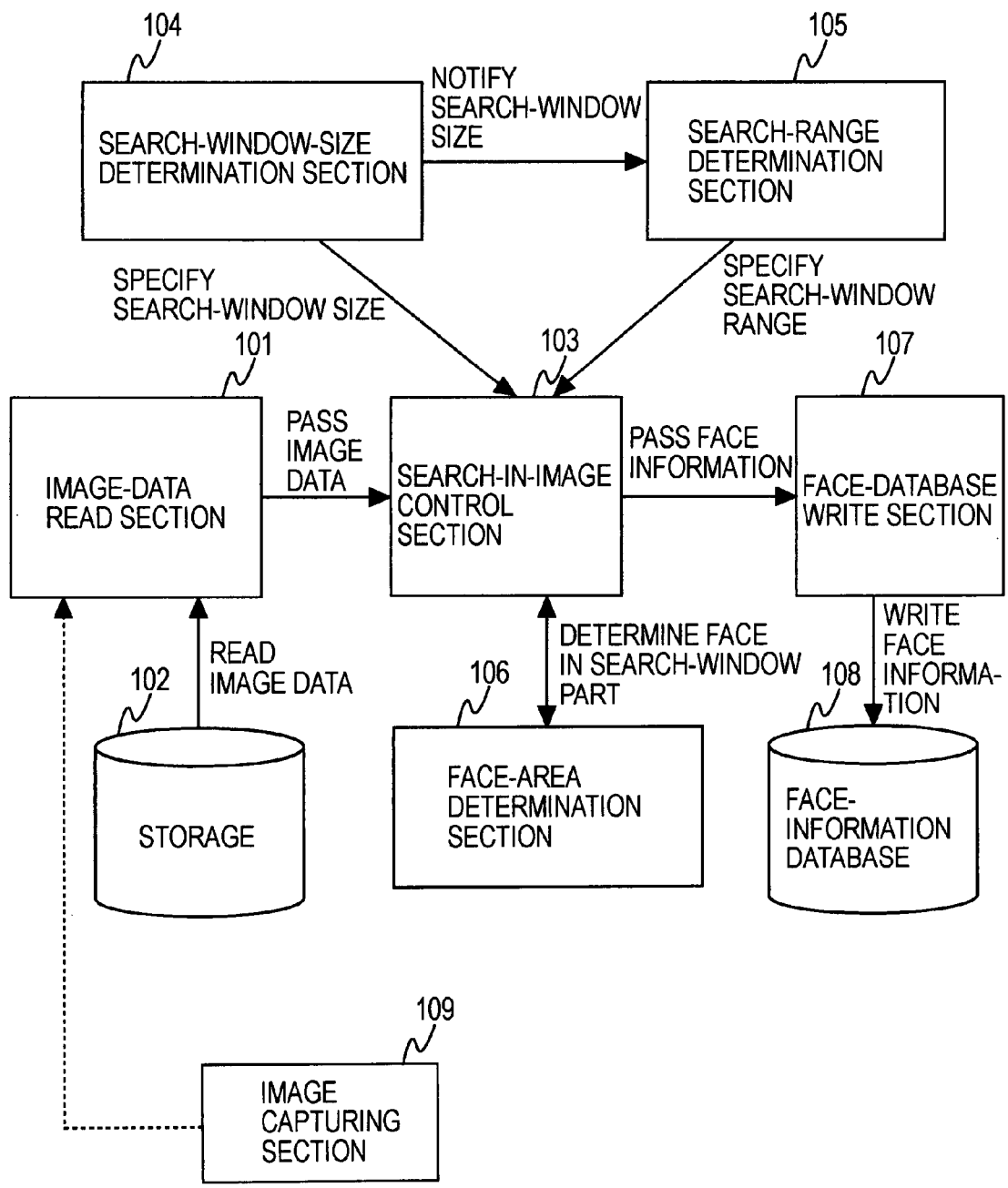
FIG. 2 is a functional block diagram of a face detection apparatus according to an embodiment of the present invention.

The control section (microcomputer) 5 performs face-detection processing. FIG. 2 is a functional block diagram representing the face-detection processing by the control section 5. In this regard, it is possible to configure the face-detection apparatus as an image processing apparatus for viewing photographs separately from the imaging apparatus.

In FIG. 2, reference numeral 101 denotes an image-data read section. The image-data read section 101 reads a predetermined image file of the image data stored in the storage 102 into a memory, for example a working RAM. The storage 102 corresponds to, for example the recording medium 10. Also, as shown by a broken line in FIG. 2, this invention can be applied not only to the stored image file, but also to the face detection of the real-time image data such as the image being captured currently from the image capturing section 109. The image data read by the image-data read section 101 is passed to the search-in-image control section 103.

The search-in-image control section 103 is provided with the specification information of the search-window size from the search-window-size determination section 104, and is provided with the specification information of the search range from the search-range determination section 105. The search-in-image control section 103 scans the image in the same manner as raster scanning in the specified search range with the search window of the specified size on the basis of the specification information. That is to say, the search window is moved a predetermined amount of movement in the horizontal direction from the upper left corner of the search range. When the search window reaches the right end of the search range, the search window returns to the left end, and the position of the search window is changed downward, and the scanning is performed in the horizontal direction. This operation is repeated, and the specified range is scanned. It is preferable that the amount of movement (m pixels) for each one step in the horizontal direction and the in vertical direction is approximately proportional to the size of the search window. Thus, the amount of movement is set to, for example one tenth of the length of one side of the search window.

The face-area determination section 106 determines whether there is a face area in each partial image, which is the image of each search window obtained by the search-in-image control section 103 searching the search range. For a method of determining a face area, it is possible to use a know method described in the Description of the Related Art. If there are a plurality of face areas in one image file, face areas are detected in a plurality of partial images. In that case, the information of the number of captured face areas is recorded in the classification label information (in the following, referred to as meta-data appropriately) of the image file. The meta-data is data describing the attributes of individual image files, and is stored in the face-information database 108 in relation to the image files. In this regard, the face-information database 108 stores only the meta-data, but may store the images of the face areas or the shrunk images thereof if an increase in the storage capacity is allowed. Also, the following may be extracted as meta-data by the face-area determination in addition to the number of face areas:

The position of the face area in each face area

The size of each face area

The looking direction of a face in each face area

When the face-area determination section 106 has determined that there is a face area, the meta-data, for example the data of the number of face areas, is passed to the face-database write section 107 through the search-in-image control section 103. The face-database write section 107 writes meta-data in a face-information database 108. The face-information database 108 is a database storing only the mata-data of face information. The mata-data is held in relation to the corresponding image files. The face-information database 108 is built in the storage 102 or another memory.

FIG. 2 is a functional block diagram corresponding to the processing as far as building the face-information database 108. Furthermore, although not shown in the figure, it is possible to implement various applications using the face information stored in the face-information database 108. For example, it is possible to search an image file including a user-specified number of face areas. Also, it is possible to sort image files in accordance with the number of face areas. Furthermore, it is possible to detect a face area from a real-time image being captured, and then to perform an auto-focus operation in order to focus the camera on the face area or to perform auto-exposure processing in order to conduct correct exposure on the face area.

Up to now, the search window has been set for each size of all the face areas that can be assumed, and the entire image to be processed has been scanned by each search window. Thus, there has been a problem in that the processing time for the detection of a face area becomes long. In an embodiment of the present invention, when a face area is searched, the speed of the processing is increased by limiting the search range in the image to be processed to the area including a face, which has been obtained in advance. The area including a face means an area having a high probability of including a face area of an object of shooting. The largest area including a face equals to the entire area (all the range) of the target image.

For a method of setting an area including a face, there are tow possible methods. One is a method of setting fixedly in accordance with the processing power of the hardware, etc. The other is a method of performing statistical processing on image data, such as a photograph actually taken, etc., and to make an estimation. In the method of setting fixedly, an area including a face is set so as to include, for example the vicinity of the central part of the image, and to have an area about one half the area of the entire image.

In this regard, in the following description, one kind of area including a face is set. However, it is possible to set two kinds or more of areas including a face, which have different sizes with each other. Also, the area including a face may be changed in accordance with the direction (vertical/horizontal) of the camera at shooting time. Furthermore, the area including a face may be changed in accordance with the shooting mode, such as a portrait shooting mode, a scenery shooing mode, etc. At the time of the portrait-shooting mode, the vicinity of the central part is emphasized. At the time of the scenery shooing mode, it is necessary to consider that there is a high possibility that a face of an object of shooting is included in the peripheral part. In any of the methods, it is desirable that the vicinity of the center of the image is included in the area including a face.

A description will be given of a method of estimating an area including a face by a statistical method as an example. The estimation processing of an area including a face is performed as initial setting processing of the face-detection apparatus shown in FIG. 2, or the other processing by the apparatus other than the face-detection apparatus, for example a personal computer. The area including a face, which has been obtained as a result of the estimation, is applied to the face-detection apparatus as general-purpose data. An area including a face is estimated using a plurality of, for example several hundreds of image groups. By plotting the center position of a face area including a face in each image in image groups, it is possible to obtain a distribution map of the positions of faces in an image group. In this regard, for a method of detecting a face area, the same method as that in the processing in the face-detection apparatus, or another method is used. For example, the user may plot the center positions by operating an input device, such as a mouse, etc., while viewing a screen.

Figure 3:
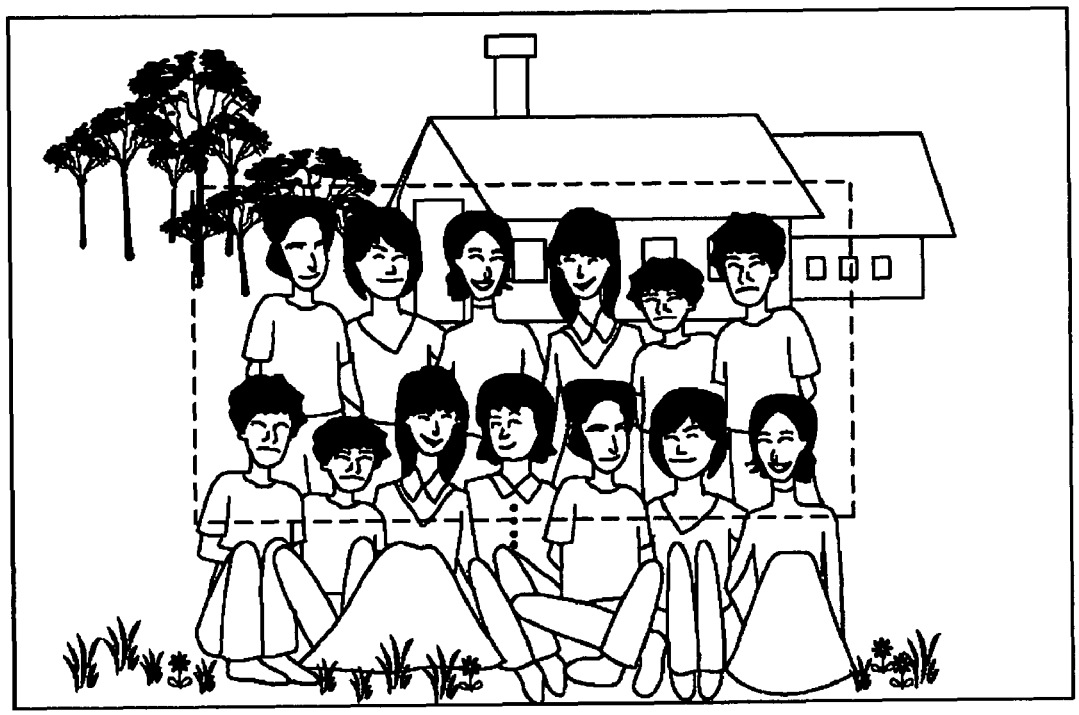
FIG. 3 is a schematic diagram used for explaining an area including a face according to an embodiment of the present invention.
Figure 4:
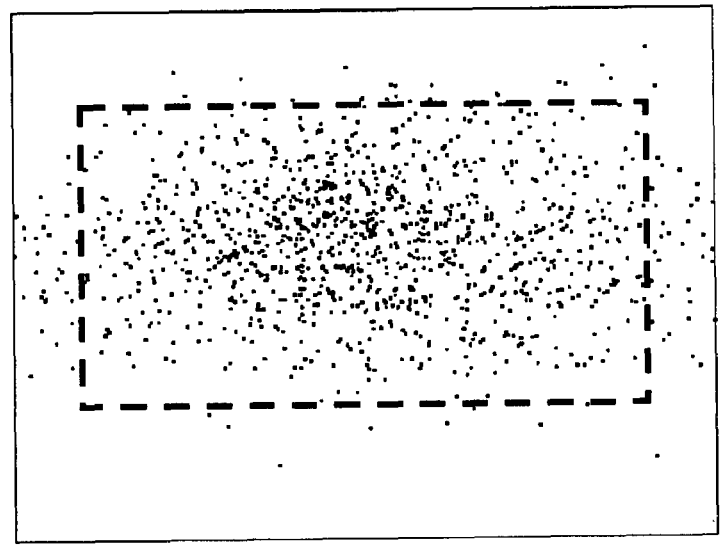
FIG. 4 is a schematic diagram used for explaining a face distribution map according to an embodiment of the present invention.

An example (group photograph) of one image out of an image group is shown in FIG. 3. Face areas are detected, and the center positions of each detected face area are plotted. FIG. 4 is an example of a face distribution map obtained from, for example an image group including 800 images. An area including a face is estimated using a face distribution map. An example of an estimating method is to divide a distribution map including a range including at least a plot into a unit (called a block) of an equal size, to perform threshold processing of the number of faces contained in each block, and to determine that the block including the number of faces greater than a threshold value is an area including a face. In FIGS. 3 and 4, rectangular areas indicated by broken lines show estimated area including a face.

Also, it is allowed to use another method of estimation in which a part including a face in the image is provided with a constant weight (simply, +1), the weight for each position is accumulated to obtain a histogram with respect to all the face areas in the image, the frequencies therein are subjected to threshold processing, and the obtained area is subjected to a rectangular approximation. Furthermore, it is allowed to use a method in which a score is added when there is another plotted point in the vicinity within a certain radius of each plotted point in the distribution map, the distribution of the scores is subjected to threshold processing, and the obtained area is subjected to a rectangular approximation.

The information of the area including a face, which has been estimated in this manner, is held as data in the search-range determination section 105 of the face-detection apparatus shown in FIG. 2. A nonvolatile memory is used as a memory for holding the data. If the size of the search window is smaller than a predetermined threshold value, the detection processing of face areas is performed only in the area including a face.

The reason for changing the area including a face depending on the size of the search window, that is to say, the size of a face to be detected is that it is necessary to prevent omission of detection of face areas of the object of shooting, which is to be a main subject of the image, as much as possible. For example, if the size of a face (the size of the search window) to be detected is relatively small, the search range of face areas is limited to the area including a face. On the contrary, if the size of a face (the size of the search window) to be detected is relatively large, the search range of face areas is not limited to the area including a face, and is set to the entire image.

In the case of a photograph, a human figure taken with a relatively large face is likely to be an important object of shooting in the photograph in many cases. If a large search window is set, it is preferable not to limit the search range to the area including a face. On the contrary, if a small search window is set and a small face area is detected, the importance of the object of shooting is relatively little, and thus there is little possibility that a face of an important object of shooting is not detected even if the search range is limited to the area including a face. For example, in the case of a group photograph as shown in FIG. 3, the size of the face area of each person becomes small, and the probability that there is a face in the peripheral part of the image becomes low.

Furthermore, the amount of calculation necessary for processing one picture in the face-detection processing increases as the search window becomes smaller. Thus, the effect of the reduction in the amount of calculation by limiting the search range when the search window is small is relatively larger compared with the case of a large search window. The following measures are taken from such a viewpoint. If the search window is large, face areas are detected from the entire image, whereas if the search window is small, face areas are detected only in the area including a face, thereby the amount of calculation necessary for processing is decreased while preventing the omission of the detection of important face areas. Accordingly, the processing time is shortened.

Figure 5:
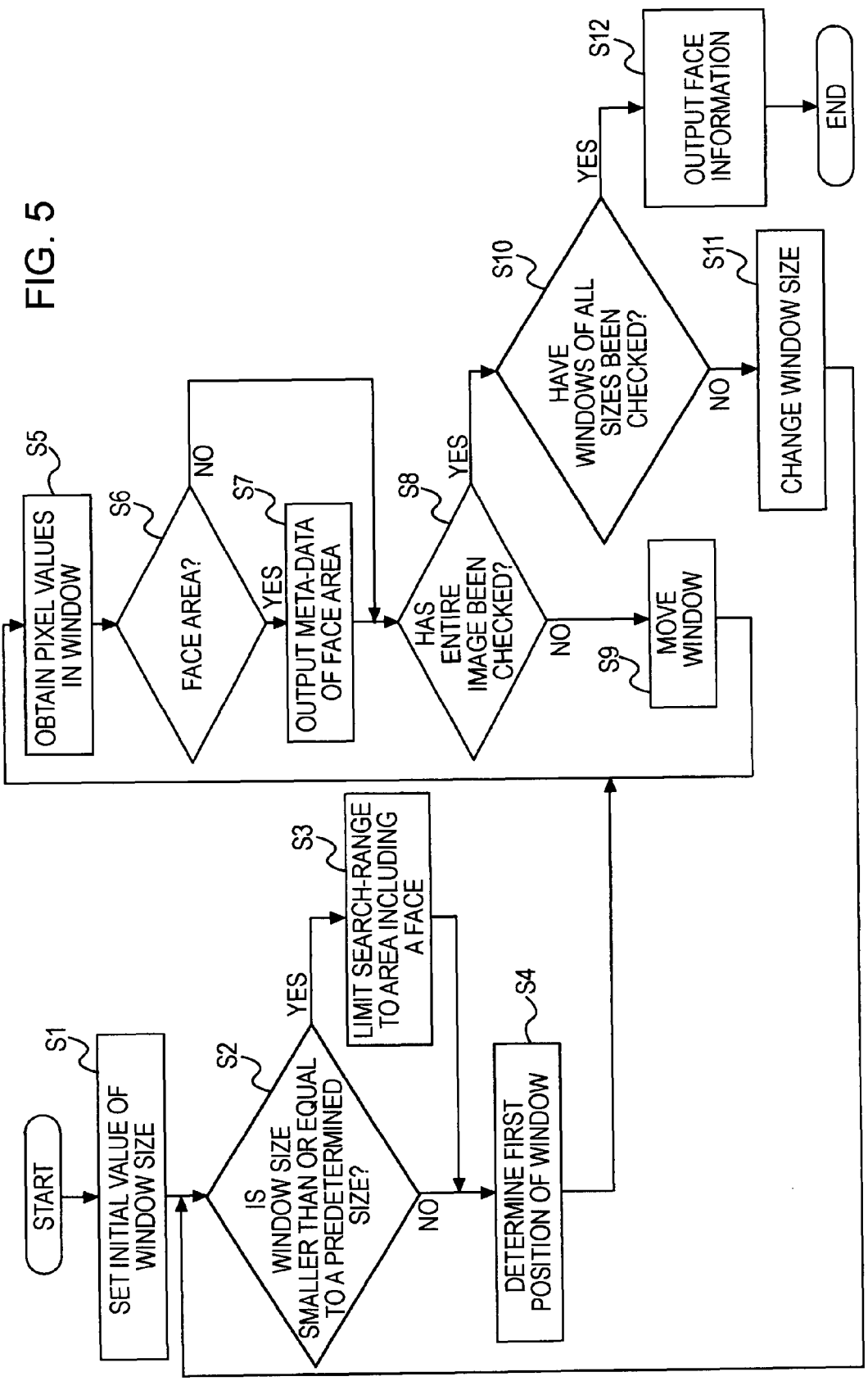
FIG. 5 is a flowchart illustrating a flow of face detection processing according to an embodiment of the present invention.
Figure 6A:
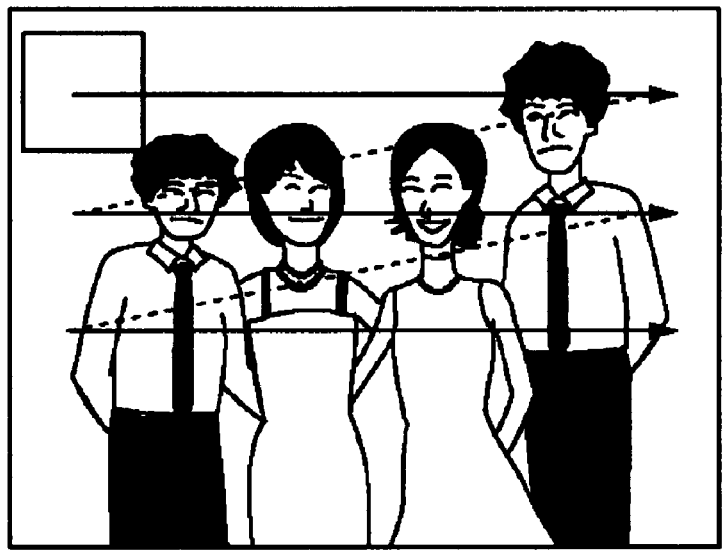
FIG. 6 is a schematic diagram for explaining the scanning by a search window in the face detection processing.
Figure 6B:
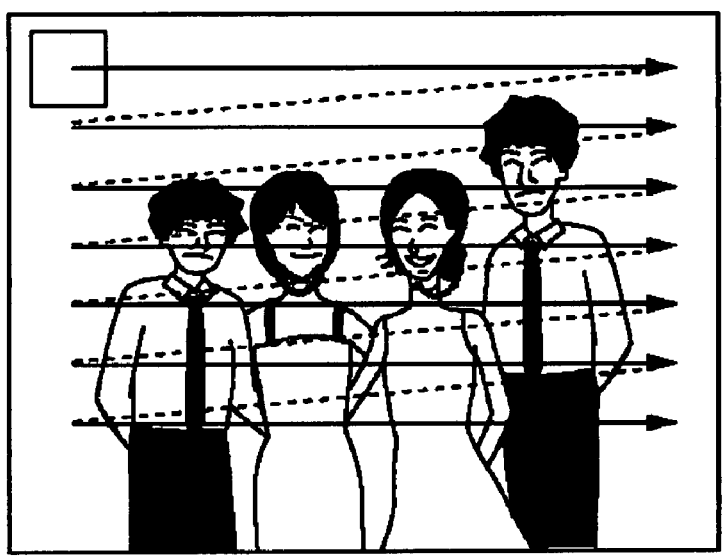

FIG. 5 is a flowchart illustrating the flow of the face-area detection processing executed by the configuration of the functional block diagram shown in FIG. 2. In first step S1, the size of the search window (simply described as a window in FIG. 5) is set in the initial value. For example, the smallest size out of a plurality of sizes provided is set in the initial value. The search-window-size determination section 104 in FIG. 2 sets the size of the search window.

In comparison step S2, a determination is made on whether the size of the search window is less than or equal to a predetermined size. The predetermined size is a threshold value. If the determination result of the comparison step S2 is negative (NO), the processing proceeds to step S4. In step S4, the first position of the search window is determined. If the determination result of the comparison step S2 is affirmative (YES), the search range is limited to an area including a face. The comparison steps S2 and S3 are processed by the search-range determination section 105. The area including a face is obtained in advance, and held in the search-range determination section 105.

If the search range is not limited, the scan-start position of the search window in step S4 is set to, for example the upper left corner of the entire image. If the search range is limited in step S3, the scan-start position of the search window is set to, for example the upper left corner of the area including a face. The scan-start position can be set to an arbitrary position in addition to these. Also, the scanning mode is not limited to the raster scanning described above, and it is possible to scan from the center toward the periphery, etc.

In step S5, the pixel values of the partial image in the search window is obtained. In the case of a color image, a luminance value is obtained as a pixel value. The pixel values of the obtained partial image are determined whether or not the image is a face area in determination step S6. The face-area determination section 106 performs the processing in the determination step S6. If determined as a face area, the meta-data of the face area is output in step S7. The meta-data is, for example the number of face areas. In that case, the counter of the number of face areas is incremented in step S7. The meta-data is held in the search-in-image control section 103.

After the processing in step S7 or if the determination result of the determination step S6 is negative, a determination in made on whether the entire image has been checked in determination step S8. If a determination is made that the entire image has not been checked in the determination step S8, the processing proceeds to step S9, and the search window is moved to the next position. Then, the processing returns to step S5 (obtaining the pixel values in the search window).

The processing in step S5, step S6, step S7, and step S8 is repeated for a new search window. When the face-area detection processing by the search window having a certain size is completed, the result of the determination step S8 (determination on whether the entire image has been checked) becomes affirmative, and the processing proceeds to determination step S10. In the determination step S10, a determination is made on whether a face area is detected for the search windows of all the sizes.

If the determination for the search windows of all the sizes has not completed, the size of the search window is changed to the next level, for example a larger size in step S11. Then, the processing returns to the determination step S2 (determination of the size of the search window with respect to a threshold value). If a newly set size of the search window is larger than the threshold value, the search range is not limited. IF the size of the search window is smaller than or equal to the threshold value, the search range is limited to the area including a face. After that, the detection processing of a face area is performed in the search range using a newly set search window.

If the determination result of the determination step 10 is affirmative, that is to say, if a determination is made that the face-area detection has been completed for the search windows of all the sizes, the face information (meta-data) is output in step S12. The face information is passed from the search-in-image control section 103 to the face-database write section 107 in FIG. 2. The passed meta-data is stored in the face-information database 108.

The determination step S2 in the flowchart in FIG. 5 and the search-range limit processing step S3 executed selectively depending on the determination result are characteristic processing of an embodiment of this invention. If the search window is smaller than or equal to the threshold value, the search range is limited to the area including a face, and thus the amount of calculation for detecting a face area can be decreased, making it possible to reduce the processing time. In this regard, when the user sets the size of a face (the size of the search window), it is possible to control the search range in accordance with the setting value in addition to dynamically changing the search window.

In the above, a specific description has been given of an embodiment of the present invention. This invention is not limited to the above-described embodiment, and various modifications are possible on the basis of the technical idea of the invention. For example, this invention is suitable for applying to a mobile apparatus. However, the invention is not limited to a mobile apparatus, and can be applied to a stationary apparatus, for example a viewer for viewing captured images. Furthermore, this invention can be implemented as a face-detection apparatus by installing the processing as shown in FIG. 5 in a personal computer as a program. Also, the program describing the processing content can be recorded in a recording medium capable of being read by a computer, such as a magnetic recording device, an optical disc, a magneto-optical disc, a semiconductor memory, etc.

What is claimed is:

1. An image processing apparatus comprising:
   image acquiring means for acquiring an image;
   search-window-size setting means for setting a size of a search window;
   search-range setting means for setting a search range as an area of the image for scanning with the search window, in relation to the set size of the search window;
   scanning means for moving the search window having the set size in the set search range to scan the set search range in its entirety without changing the set size of the search window;
   face-area determination means for determining whether the image in the set size of the search window at each scanning position in the set search range is a face area; and face-information output means for outputting information of the face area obtained from a determination result of the face-area determination means, wherein the search-range setting means compares the set size of the search window with a predetermined threshold value of a size of a search window, and if the set size of the search window is any size less than or equal to the predetermined threshold value, the search-range setting means limits the set search range as the area of the image for scanning with the set size of the search window to a search range smaller than the entire area of the image.

2. The image processing apparatus according to claim 1, wherein if the set size is larger than the predetermined threshold value, the search-range setting means sets the set search range to the entire area of the image.

3. The image processing apparatus according to claim 1, wherein the search range smaller than the entire area of the image is a predetermined area including a central part of the image.

4. A method of image processing, comprising the steps of:

image acquiring for acquiring an image by use of image acquiring means;

search-window-size setting for setting a size of a search window by use of search-window-size setting means;

search-range setting for setting a search range as an area of the image for scanning with the search window, in relation to the set size of the search window by use of search-range setting means;

scanning for moving the search window having the set size in the set search range by use of scanning means to scan the set search range in its entirety without changing the set size of the search window;

face-area determining for determining whether the image in the set size of the search window at each scanning position in the set search range is a face area by use of face-area determination means; and face-information outputting for outputting information of the face area obtained from a determination result of the face-area determining step, wherein the search-range setting step compares the set size of the search window with a predetermined threshold value of a size of a search window, and if the set size of the search window is any size less than or equal to not larger than the predetermined threshold value, the search-range setting step limits the set search range as the area of the image for scanning with the set size of the search window to a search range smaller than the entire area of the image.

5. The method of image processing according to claim 4, wherein if the set size is larger than the predetermined threshold value, the search-range setting step sets the set search range to the entire area of the image.

6. The method of image processing according to claim 4, wherein the search range smaller than the entire area of the image is a predetermined area including a central part of the image.

7. An imaging apparatus comprising:

a camera section for acquiring an image of an object of shooting;

a camera-signal processing section for performing signal processing on an imaging signal from the camera section;

a storage section for storing the imaging signal; and a control section for controlling operations of the imaging apparatus, wherein the control section includes a search-window-size setting section for setting a size of a search window;

a search-range setting section for setting a search range as an area of the image of the object of shooting for scanning with the search window, in relation to the set size of the search window;

a scanning section for moving the search window having the set size in the set search range to scan the set search range in its entirety without changing the set size of the search window;

a face-area determination section for determining whether the image in the set size of the search window at each scanning position in the set search range is a face area; and a face-information output section for outputting information of the face area obtained from a determination result of the face-area determination section, wherein the search-range setting section compares the set size of the search window with a predetermined threshold value of a size of a search window, and if the set size of the search window is any size less than or equal to the predetermined threshold value, the search-range setting section limits the set search range as the area of the image for scanning with the set size of the search window to a search range smaller than the entire area of the image.

8. An image processing apparatus comprising:

an image acquiring section for acquiring an image;

a search-window-size setting section for setting a size of a search window;

a search-range setting section for setting a search range as an area of the image for scanning with the search window, in relation to the set size of the search window;

a scanning section for moving the search window having the set size in the set search range to scan the set search range in its entirety without changing the set size of the search window;

a face-area determination section for determining whether the image in the set size of the search window at each scanning position in the set search range is a face area; and a face-information output section for outputting information of the face area obtained from a determination result of the face-area determination section, wherein the search-range setting section compares the set size of the search window with a predetermined threshold value of a size of a search window, and if the set size of the search window is any size less than or equal to the predetermined threshold value, the search-range setting section limits the set search range as the area of the image for scanning with the set size of the search window to a search range smaller than the entire area of the image.

* * * * *